United States Patent
Rohloff et al.

(10) Patent No.: US 10,294,152 B2
(45) Date of Patent: May 21, 2019

(54) METHOD FOR PRODUCING A POZZOLANIC OR LATENT-HYDRAULIC CEMENT CLINKER SUBSTITUTE

(71) Applicant: ThyssenKrupp Industrial Solutions AG, Essen (DE)

(72) Inventors: Kathrin Rohloff, Hamburg (DE); Michael Enders, Münster (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 155 days.

(21) Appl. No.: 15/101,572

(22) PCT Filed: Dec. 4, 2014

(86) PCT No.: PCT/EP2014/003252
§ 371 (c)(1),
(2) Date: Jun. 3, 2016

(87) PCT Pub. No.: WO2015/082075
PCT Pub. Date: Jun. 11, 2015

(65) Prior Publication Data
US 2016/0304395 A1 Oct. 20, 2016

(30) Foreign Application Priority Data

Dec. 4, 2013 (DE) .................... 10 2013 113 475

(51) Int. Cl.
*C04B 7/12* (2006.01)
*C04B 7/26* (2006.01)
*C04B 7/28* (2006.01)

(52) U.S. Cl.
CPC .............. *C04B 7/28* (2013.01); *C04B 7/12* (2013.01); *C04B 7/26* (2013.01); *Y02P 40/145* (2015.11); *Y02P 40/18* (2015.11)

(58) Field of Classification Search
CPC .............. C04B 7/28; C04B 7/12; C04B 7/26
See application file for complete search history.

(56) References Cited

U.S. PATENT DOCUMENTS

| | | | | |
|---|---|---|---|---|
| 3,941,872 A | * | 3/1976 | Puskar | C09C 1/42 106/486 |
| 4,395,289 A | * | 7/1983 | Balakirev | C04B 18/023 106/657 |
| 8,741,054 B2 | * | 6/2014 | Fried | C04B 18/023 106/705 |
| 8,906,155 B2 | * | 12/2014 | Gasafi | C04B 7/13 106/811 |
| 9,458,059 B2 | * | 10/2016 | Ballan | C04B 14/106 |
| 2006/0210463 A1 | * | 9/2006 | Comrie | B01D 53/30 423/215.5 |
| 2008/0282947 A1 | | 11/2008 | Knowles | |
| 2012/0240833 A1 | * | 9/2012 | Leach | C01B 33/40 110/344 |
| 2014/0000491 A1 | | 1/2014 | Gasafi et al. | |
| 2015/0122161 A1 | * | 5/2015 | Landon | C10L 9/10 110/342 |

FOREIGN PATENT DOCUMENTS

| | | | |
|---|---|---|---|
| CN | 1052297 A | * 6/1991 | |
| CN | 1122784 A | 5/1996 | |
| CN | 1792943 A | * 6/2006 | |
| CN | 103360033 A | 10/2013 | |
| DE | 10 2008 031 165 A1 | 1/2010 | |
| DE | 10 2008 061 743 A1 | 6/2010 | |
| DE | 10 2011 014 498 B4 | 9/2012 | |
| GB | 2247306 A | 2/1992 | |
| WO | 2010000383 A1 | 1/2010 | |
| WO | 2010066316 A1 | 6/2010 | |
| WO | WO-2010066316 A1 | * 6/2010 | ............ C04B 7/28 |

OTHER PUBLICATIONS

English Language Abstract of CN1122784A
English language Abstract of CN103360033A.
International Search Report for PCT/EP2014/003252 dated Apr. 9, 2015 (mailed Apr. 29, 2015).

* cited by examiner

*Primary Examiner* — Anthony J Green
(74) *Attorney, Agent, or Firm* — thyssenkrupp North America, Inc.

(57) ABSTRACT

Methods for producing pozzolanic or latent hydraulic cement clinker substitutes may involve calcining clay with a fuel comprising a mineral substance at temperatures in the range from 500 to 1250° C., preferably from 550 to 1150° C., most preferably from 700 to 900° C. A resulting mixture of mineral substance from the fuel and the calcined clay forms a pozzolanic or latent hydraulic cement clinker substitute, in which a fraction of the mineral substance incorporated into the pozzolanic or latent hydraulic cement clinker substitute by the fuel is 1-60% by weight.

20 Claims, 1 Drawing Sheet

METHOD FOR PRODUCING A POZZOLANIC OR LATENT-HYDRAULIC CEMENT CLINKER SUBSTITUTE

CROSS REFERENCE TO RELATED APPLICATIONS

This application is a U.S. National Stage Entry of International Patent Application Serial Number PCT/EP2014/003252, filed Dec. 4, 2014, which claims priority to German Patent Application No. DE 102013113475.0 filed Dec. 4, 2013, the entire contents of both of which are incorporated herein by reference.

FIELD

The present disclosure relates to methods for producing a pozzolanic or latent hydraulic cement clinker substitute.

BACKGROUND

Annual $CO_2$ emissions produced by the cement industry are of the order of 4 Gt. There are therefore methods being made to reduce the $CO_2$ emissions per metric ton of cement, by measures such as fuels from biomass, residual heat recovery, substitution of cement clinker by pozzolans, or the deposition of the $CO_2$ from smoke gases. A particularly effective measure here is the reduction of the clinker factor, by replacing part of the clinker with pozzolanic substances, such as slag sand, flyash, natural pozzolans, or limestone. In order to maintain an overall clinker factor of currently 76 (wwwb.wbcsdcement.or), the demand for clinker substitutes in the case of annual cement production of around 4 Gt is around 1 Gt. Against the background of the increasing production of cement worldwide, moreover, the demand for clinker substitutes will increase further.

The decision in favor of a binder substitute is made according to the regional availability of the material and the associated costs of acquiring it and the logistics. In the cement, furthermore, any clinker substitute (limestone, slag sand, flyash, pozzolan) makes a specific contribution to hydration reactions and hence to the development of strength.

Depending on the use of the cement and on the regulations for binder composition and on the concrete standards, levels of clinker substitution in Europe, apart from the secondary constituents (0-5%), are 5-95% (CEM II A/B, CEM IIIC). Limestone in particular, however, can usually be added only up to about 20% without a critical loss of binder performance. Other sets of standards, with national validity, are oriented not on the binder composition but instead solely on the functionality of the binder, and allow even higher levels of addition of pozzolanic additives (e.g., ASTM C595 , SNI 15-0302-2004), or have no regulations at all regarding cement composition (ASTM C1157).

Another clinker substitute, though having been little utilized up to now, constitutes calcined clays, which can be used as a clinker replacement and additive in cement and concrete. DE 10 2011 014 498 B4 describes in more detail a method for producing a clinker replacement from calcined clay.

Clay minerals are phyllosilicates—sheet or layered silicates—which are characterized by a stacked alternation of silicon-rich, aluminum-rich, or silicon-rich and aluminum-rich layers with interlayers of hydroxide, alkali metals, or water. Inexpensive clays, moreover, often have impurities, as a result of elevated iron levels, for example. Depending on the manifestation of the iron, elevated iron levels in particular may result, on calcining, in a typical red discoloration, which is apparent to start with in the calcined clay, but then also in the cement and concrete when the clay is used as a clinker substitute, this discoloration arising from the reddening trivalent iron.

In view of the costs of high-purity clays, simple inexpensive grades are the only ones contemplated as a clinker substitute of binders. Clay manifestations—especially those featuring low purity—are widespread. In order to correct the red discoloration, DE 10 2011 014 498 B4 proposes a special cooling process under reducing conditions, or the injection of oil into a cooler in order to generate a reducing atmosphere. In this reducing atmosphere, up to $\frac{1}{3}$ of the reddening trivalent iron in the hematite is reduced, and the gray iron-iron spinel (magnetite) is formed. The gray color can be accorded particular significance in the context of acceptance of the cement by the end customer.

In the calcining of clay, which is carried out for example in a rotary kiln, a suspension-type heat exchanger, a fluidized bed, or else in a multitier furnace, the clay minerals first of all give up surface water and then lose structural water. A consequence of this giving-up of water is the phase transition of the crystalline clay minerals into X-ray-amorphous meta-clay minerals. On further heating (500-1250° C.) of the clay minerals, the melting of the meta-clay minerals is accompanied by formation either of aluminosilicate glasses or else, in the case of an appropriate chemical/mineralogical composition, of high-temperature phases such as mullite or cristobalite. The flame temperature of an internal firing is difficult to regulate in the low-temperature range. For this reason, external firing chambers are usually used for calcining clays, and the hot gas is brought to the desired calcining operation temperature using cooler external air. An inherent drawback of this method is the high level of excess air, with the risk of extensive oxidation of the iron compounds from the raw clay materials.

The pozzolanic properties of the calcined clays are favorable for use as a clinker substitute. A further advantageous solution would be to combine calcined clays with those materials—flyashes, for example—which enhance other qualities of the cement (e.g. the workability, the water demand, or the hydraulic reactivity) or which permit a higher clinker substitution rate. It is known practice to generate composite cements with calcined clay and flyash by joint grinding or by mixing in a mixing unit. In both cases, however, there is a need not only for a calcining unit but also for further storage and associated conveying and mixing equipment for all the components of the blended cement.

A need exists, therefore, for methods for producing a pozzolanic or latent hydraulic cement clinker substitute that is more cost effective and that can be rapidly produced.

It is an object of the invention, therefore, to specify a method for producing a pozzolanic or latent hydraulic cement clinker substitute that is notable for more cost effective and more rapid production.

DETAILED DESCRIPTION

Figure 1:
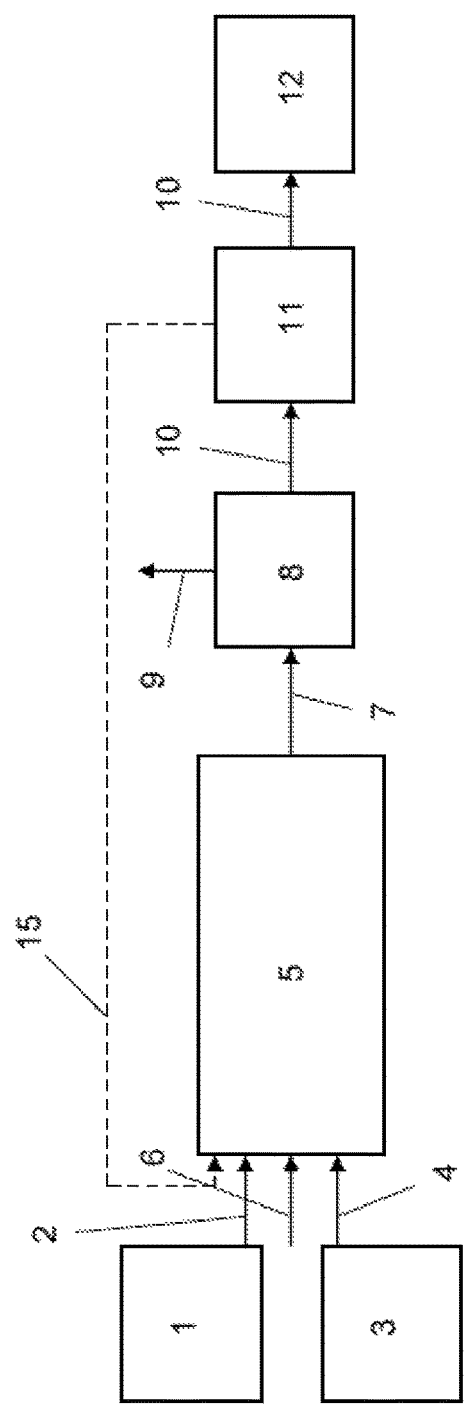
FIG. 1 is a schematic block diagram of an example method involving a calciner with internal firing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

In some example methods of the present disclosure for producing a pozzolanic or latent hydraulic cement clinker substitute, clay may be calcined with a fuel comprising a mineral substance at temperatures in the range of 500-1250° C., preferably of 550-1150° C., most preferably of 700-900° C., and the resulting mixture of the mineral substance from the fuel and the calcined clay may form the pozzolanic or latent hydraulic cement clinker substitute, in which the fraction of mineral substance incorporated into the hydraulic cement clinker substitute of fuel may be 1-60 wt %.

According to some example methods of the present disclosure, the mixture of calcined clay and the mineral substance, such as flyash, for example, may be produced during the calcining operation itself. Therefore, in some cases there may be no need either for individual constituents (calcined clay and flyash) to be stored and conveyed, or for a separate mixing operation.

The fuel used for calcining the clay is selected such that the fraction of mineral substance incorporated into the hydraulic cement clinker substitute by the fuel is preferably 3-55 wt %, most preferably 5-50 wt %. Ideally the fraction is 20-40 wt %. The preferred fuels, or the mineral substance resulting from them, preferably have a ratio of $Al_2O_3$ to $SiO_2$ of 0.13-1.4 wt %, preferably 0.26-0.87 wt %, and a CaO content of less than 80 wt %, preferably 0.5-50 wt %.

Natural gas and crude oil are therefore not among the preferred fuels, since owing to the high gross calorific values of 35-50 MJ/kg and the low ash content of below 2-3 wt %, with an average energy requirement of 2-3 MJ/kg for the calcining of the calcined clay, they only introduce low ash fractions of 0.1-1 wt % from the fuel into the cement clinker substitute. Moreover, in the case of crude oil, there is the problem that combustion is accompanied by release, for example, of vanadium compounds and chromium compounds, which are corrosive within the combustion units and are therefore undesirable. In the cement clinker substitute as well, elevated levels of chromium are a disadvantage on account of the possible $Cr^{6+}$ content. In many cases, residues from incineration of waste are of very limited usefulness as well, since the combustion of plastics is accompanied by release, in particular, of chlorides, which are then bound up in the cement clinker substitute and would very rapidly exceed the limit level of 0.1 wt % of chlorine in binder. Furthermore it should be ensured that the overall alkali metal content of the cement clinker substitute is below 4 wt %, in order to limit the unwanted alkali metal silicate reactions. Alkali metal contents of 0.25-2.5 wt % have proven particularly suitable for the pozzolanic or latent hydraulic cement clinker substitute. Fuels with elevated levels of phosphorus, as may be the case with sewage sludge, for example, should likewise be avoided, or should be added only in small amounts to the regulating fuel, since the phosphorus content in cements in practice is limited to 0.5 wt %, with the consequence that elevated phosphorus levels if using sewage sludge would have a greatly detrimental effect on the overall process.

Coal, therefore, has emerged with particular advantage as a fuel.

The properties of the pozzolanic or latent hydraulic cement clinker substitute produced in accordance with the invention can be influenced in a variety of ways. For instance, the ratio of calcined clay and mineral substance is determined essentially by the fuel used, with critical significance attaching to the heating value as well as to the fraction of mineral substance present in the fuel (particularly in the ash content). Since a defined quantity of heat is necessary for calcining clay, the amount of fuel to be used and hence the amount of mineral substance incorporated via the fuel are dependent substantially on the heating value of the fuel. For the calcining of the clay, preference is given to using fuel, more particularly coal, having a heating value in the range of 3500-35 000 kJ/kg. The desired amount of mineral substance may therefore be determined in a specified way through the fuel to be used or mixtures of different fuels. Depending on the desired properties for the cement clinker substitute, the fraction of mineral substance supplied to the calcining operation is calculated such that in the cement clinker substitute there is a mandated mixing ratio of calcined clay to mineral substance in the range of 0.5:1-20:1.

Another tool for adjusting the properties of the cement clinker substitute is the particle size distribution of the fuel used for calcining, and/or the composition of the mineral substance contained in the fuel. Thus, for example, the workability, particularly the water demand of the cement clinker substitute, can be adjusted by comminuting the fuel to a mandated particle size distribution. The fuel, more particularly coal, is used preferably with a particle size in the range of, for example, 0.025-4 mm, more preferably less than 1 mm. Correspondingly, of course, the particle size of the clay also affects the properties of the cement clinker substitute produced in accordance with the invention. Before being calcined, therefore, the clay is ground to particle sizes <10 mm, preferably <5 mm, more particularly <2 mm, and most preferably <1 mm. The finer the clay to be calcined, the more rapid and more complete the calcining. Calcining may be carried out, for example, in a suspension-type heat exchanger, a rotary kiln, a fluidized bed, or a multitier furnace. In the context of the invention it is possible to regulate the chemical substance of the mineral substance produced in the calcining operation by using a mixture of fuels with different mineral substance compositions.

A further possibility is to produce a cement by jointly grinding a cement clinker with the cement clinker substitute described in more detail above, or to mix separately comminuted clinker substitute and separately ground cement clinker to form cement.

In the exemplary embodiment in accordance with FIG. 1, a fuel 2 having appropriate properties and carbon contents is fed from a fuel store 1, via a combustion assembly not shown in any more detail, to a calciner 5. In parallel with this, the calciner is supplied with clay 4 provided from a clay store 3. Furthermore, the calciner 5 may be supplied with an additional stream 6 of material, as for example with a further fuel, or with flyash having a carbon fraction of at least 0.5 wt %.

In the calciner, the supplied clay 4 is dewatered and the structural water is expelled, and so meta-clay is produced. The gas-solids suspension 7 generated in the calciner 5 is separated in a downstream cyclone 8 into a gas component 9 and a solids component, with the solids component being a pozzolanic or latent hydraulic cement clinker substitute 10, consisting of a mixture of the calcined clay and the mineral substance incorporated by the fuel. The cement clinker substitute 10 is subsequently cooled in a cooler 11, such as in a drum cooler or push grate cooler, for example. Also contemplated, however, are fluidized bed coolers, vertical coolers, screw coolers, or similar assemblies. Even stacked cooling facilities with a plurality of assemblies are conceivable. The hot outgoing air 15 obtained in the cooling operation may be discarded or may be wholly or partly recovered. Examples of possible uses for it are in an ascending tube dryer to dry the clay and/or fuel, or as regulating air in the calciner 5. Separate utilization of the heat given off, for a further operation, in direct or indirect form, is likewise possible. The heat given off may likewise be supplied for electricity generation. After the cooler 11, the cement clinker substitute is stored in a store 12, as for example in a bunker or silo.

Figure 2:
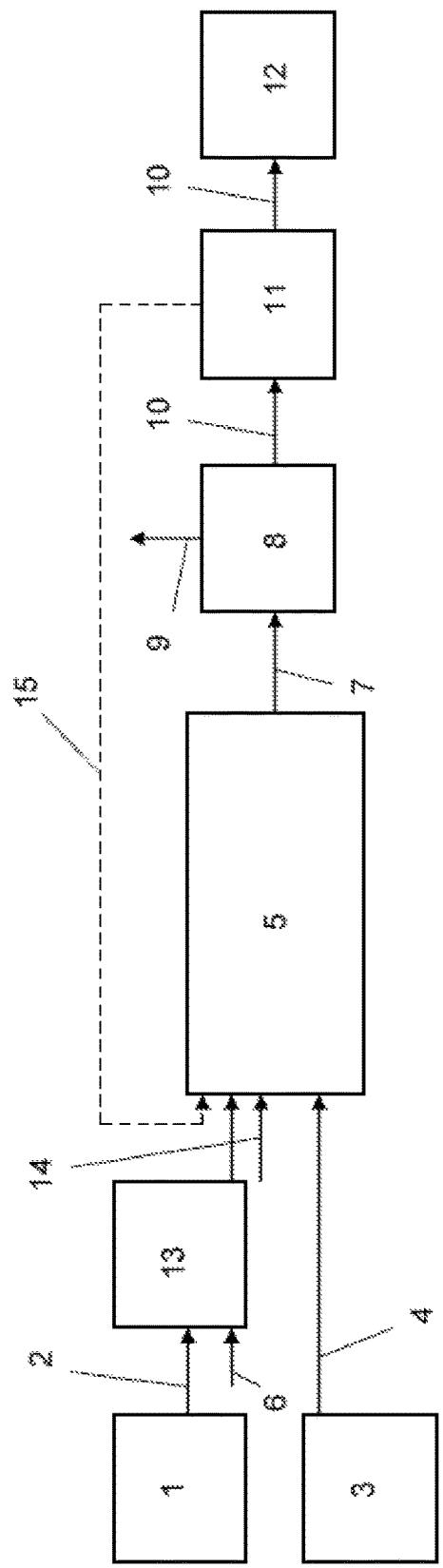
FIG. 2 is a schematic block diagram of an example method involving a calciner with external firing.

In the case of the exemplary embodiment shown in FIG. 1, the calciner 5 is equipped with internal firing, and so the fuel 2 is combusted in the calciner 5. As an alternative to this, however, in accordance with FIG. 2, it is also conceivable for the fuel 2 and any further streams 6 of substances to be combusted in an external combustion chamber 13, with the smoke gas produced being supplied together with the clay 4, and together with the mineral substance produced after combustion, to the calciner 5. The calcining temperature is regulated via introduction of fresh air 14 or by mixing of fresh air and hot outgoing air 15 given off from the cooler 11.

In the case of the implementation with internal firing in accordance with FIG. 1, a mixing ratio of calcined clay to mineral substance in the range of 0.5:1-20:1 has proven particularly favorable. Such a ratio is achieved, for example, when utilizing a coal having a low heating value of only 4000 kJ/kg and an average ash content of 40% for firing. In the case of differing grades of coal, other proportions of calcined clay to mineral substance can be established through selection of the raw materials, in accordance with the product properties desired. Furthermore, by way of the particle size distribution, it is possible to influence the desired properties of the resultant cement clinker substitute, with the fineness of the clay 4 to be calcined, and/or the fineness of the fuel used, being selected accordingly. By way of the additional streams 6 of material it is possible for further carbon-containing and carbon-free streams of material to be added, directly or after a preparatory step (classifying, grinding), with the objective of optimizing the cement clinker substitute.

The fuels for the operation are prepared using an assembly suitable for the purpose, such as a mill, for example, to a residue level of less than 10% at 150 μm, preferably less than 2% at 75 μm. Depending on the grade of fuel, the ash content, and the ignition temperature of the fuel, however, residue levels of up to 20% at 200 μm are also conceivable. The grinding of the fuels should be adjusted in terms of the ash content, in order to achieve an effect which improves the cement properties.

The clay for calcining, after being obtained from a store, is supplied to a comminuting means and to a drying means or to a combination of both. Suitable for this purpose are standard assemblies for grinding and classifying. The beater mill has proven particularly suitable with regard to the necessary energy consumption and the coupling of the two operations (grinding, drying). For operation of the calcining assembly, particle sizes <10 mm, preferably <5 mm, more particularly <2 mm, preferably <1 mm have proven sufficient. With regard to the later product properties, the comminuting step or classifying step can be adjusted in a targeted manner. Preheating and drying can be optimized by a further treatment in a vertical tube dryer. The grinding can also be used to control the burnout, the passage of heat, and the possible reduction of iron components for color correction.

In order to regulate the temperature of the calcining operation, the temperature of material in the calcining assembly and in the product from the calcining assembly is recorded. The desired operating temperature is set via introduction of oxidizing agent, e.g., air.

A further possibility arises for flyashes which because of elevated levels of carbon or other nonideal properties (free lime content, anhydrite content) are unsuitable, de facto or on account of the regulations, for use in cement or concrete. These ashes can be fed to the calcining assembly, together with the fuel or with the clay to be calcined. Particles of coke present are oxidized in the course of the thermal treatment. Moreover, calcium-containing minerals such as free lime or anhydrite, which may occur in considerable proportions in calcium-rich flyashes, are depleted in relative terms through intensive mixing with the meta-clay, or, in certain cases, are incorporated directly into the vitreous flyash constituents through reaction with meta-clay particles from the flyash or the clay to be calcined. A further advantage of this method is the oxidation of the carbon-rich constituents and, resulting therefrom, an additional heat source for the calcining.

What is claimed is:

1. A method for producing a pozzolanic or latent-hydraulic cement clinker substitute, the method comprising calcining clay at temperatures of between 500 to 1250 degrees Celsius with a fuel comprising a mineral substance, wherein a resulting mixture of the mineral substance from the fuel and the calcined clay forms the pozzolanic or latent-hydraulic cement clinker substitute that includes 1-60% by weight of the mineral substance, wherein the fuel comprising the mineral substance has a ratio of $Al_2O_3$ to $SiO_2$ of 0.13-1.4% by weight and a CaO content of less than 80% by weight.

2. The method of claim 1 wherein the resulting mixture of the mineral substance from the fuel and the calcined clay forms the pozzolanic or latent-hydraulic cement clinker substitute that includes 20-40% by weight of the mineral substance.

3. The method of claim 1 further comprising adjusting properties of the pozzolanic or latent-hydraulic cement clinker substitute via at least one of a particle size distribution of the fuel used for calcining or a composition of the mineral substance contained in the fuel.

4. The method of claim 1 further comprising adjusting a workability of the pozzolanic or latent-hydraulic cement clinker substitute by comminuting the fuel.

5. The method of claim 1 further comprising regulating a chemical composition of the mineral substance resulting from the calcining by using a mixture of fuels having different mineral substance compositions.

6. The method of claim 1 wherein the calcining is performed in a suspension heat exchanger, a rotary kiln, a fluidized bed, or a multitier furnace.

7. The method of claim 1 wherein the fuel is a flyash having a carbon fraction of at least 0.5% by weight.

8. The method of claim 1 further comprising comminuting the clay to particle sizes of less than 10 mm before the calcining.

9. The method of claim 1 further comprising calculating a fraction of the mineral substance supplied to the calcining so as to cause the pozzolanic or latent-hydraulic cement clinker substitute to have a mixing ratio of the calcined clay to the mineral substance of between 0.5:1 to 20:1.

10. The method of claim 1 wherein the fuel has a particle size of between 0.05 to 1 mm.

11. The method of claim 10 wherein the fuel is coal.

12. A method for producing a pozzolanic or latent-hydraulic cement clinker substitute, the method comprising:
    calcining clay at temperatures of between 500 to 1250 degrees Celsius with a fuel comprising a mineral substance, wherein a resulting mixture of the mineral substance from the fuel and the calcined clay forms the pozzolanic or latent-hydraulic cement clinker substitute that includes 1-60% by weight of the mineral substance; and supplying a flyash to the calcining of the clay and the fuel with the mineral substance.

13. The method of claim 12 wherein the fuel is a flyash having a carbon fraction of at least 0.5% by weight.

14. The method of claim 12 further comprising comminuting the clay to particle sizes of less than 10 mm before the calcining.

15. The method of claim 12 further comprising calculating a fraction of the mineral substance supplied to the calcining so as to cause the pozzolanic or latent-hydraulic cement clinker substitute to have a mixing ratio of the calcined clay to the mineral substance of between 0.5:1 to 20:1.

16. The method of claim 12 wherein the fuel is coal.

17. A method for producing a pozzolanic or latent-hydraulic cement clinker substitute, the method comprising calcining clay at temperatures of between 500 to 1250 degrees Celsius with a fuel comprising a mineral substance, wherein a resulting mixture of the mineral substance from the fuel and the calcined clay forms the pozzolanic or latent-hydraulic cement clinker substitute that includes 1-60% by weight of the mineral substance, wherein the fuel used in the calcining is supplemented with a fuel with a flyash having a carbon fraction of at least 0.5% by weight.

18. The method of claim 17 wherein the calcining is performed in a suspension heat exchanger, a rotary kiln, a fluidized bed, or a multitier furnace.

19. The method of claim 17 wherein the fuel is a flyash having a carbon fraction of at least 0.5% by weight.

20. The method of claim 17 further comprising calculating a fraction of the mineral substance supplied to the calcining so as to cause the pozzolanic or latent-hydraulic cement clinker substitute to have a mixing ratio of the calcined clay to the mineral substance of between 0.5:1 to 20:1.

* * * * *